US011672073B2

(12) United States Patent
Wu et al.

(10) Patent No.: US 11,672,073 B2
(45) Date of Patent: Jun. 6, 2023

(54) LAMP HAVING A SAFETY CIRCUIT, AND A SAFETY CIRCUIT FOR USE IN SUCH LAMPS

(71) Applicant: SIGNIFY HOLDING B.V., Eindhoven (NL)

(72) Inventors: Xiajuan Wu, Shanghai (CN); Dalibor Cvoric, Arnhem (NL); Ye Liu, Shanghai (CN); Haimin Tao, Eindhoven (NL); Yun Wang, Shanghai (CN); Han Lu, Eindhoven (NL); Jing Yang, Shanghai (CN); Deyong Kong, Shanghai (CN); Jing Li, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/417,173

(22) PCT Filed: Dec. 17, 2019

(86) PCT No.: PCT/EP2019/085574
§ 371 (c)(1),
(2) Date: Jun. 22, 2021

(87) PCT Pub. No.: WO2020/141066
PCT Pub. Date: Jul. 9, 2020

(65) Prior Publication Data
US 2022/0061142 A1      Feb. 24, 2022

(30) Foreign Application Priority Data

Jan. 2, 2019   (WO) ................ PCT/CN2019/070015
Feb. 22, 2019  (EP) ..................................... 19158737

(51) Int. Cl.
*H05B 45/50*       (2022.01)
*H05B 47/20*       (2020.01)
(Continued)

(52) U.S. Cl.
CPC ............. *H05B 47/20* (2020.01); *F21V 25/04* (2013.01)

(58) Field of Classification Search
CPC ........ H05B 45/31; H05B 45/40; H05B 45/50; H05B 45/52; H05B 47/02; H05B 47/16; H05B 47/20; H05B 6/66; H05B 6/666; H05B 6/68; F21V 25/00; F21V 25/04; F21K 9/272; F21K 9/278
See application file for complete search history.

(56) References Cited

U.S. PATENT DOCUMENTS 10,039,175 B1    7/2018  Thornton
10,117,302 B1 * 10/2018  Lo ...................... H05B 45/3725
(Continued)

FOREIGN PATENT DOCUMENTS

CN     106015996 A    10/2016
CN     206555763 U    10/2017

*Primary Examiner* — Thai Pham (57) ABSTRACT

A lamp has a safety circuit connected to first and second electrical connection terminals. A test is used to detect if the first and second electrical connection terminals are both connected to external power without an interfering impedance such a human body, and only then enable operation of the lamp. A time for the test is different from a time when another lamp in the system applies a test.

15 Claims, 6 Drawing Sheets

(51) Int. Cl.
*F21V 25/00* (2006.01)
*F21V 25/04* (2006.01)

(56) References Cited

U.S. PATENT DOCUMENTS

| | | |
|---|---|---|
| 2014/0055029 A1 | 2/2014 | Jans et al. |
| 2017/0159923 A1* | 6/2017 | Liu .......................... F21V 25/02 |
| 2018/0238531 A1 | 8/2018 | Hsia |
| 2018/0263096 A1 | 9/2018 | Deixler et al. |
| 2018/0310370 A1* | 10/2018 | Heilman ................. H05B 45/50 |
| 2018/0324925 A1* | 11/2018 | Lu .......................... H05B 45/50 |

* cited by examiner

Prior Art

LAMP HAVING A SAFETY CIRCUIT, AND A SAFETY CIRCUIT FOR USE IN SUCH LAMPS

CROSS-REFERENCE TO PRIOR APPLICATIONS

This application is the U.S. National Phase application under 35 U.S.C. § 371 of International Application No. PCT/EP2019/085574, filed on Dec. 17, 2019, which claims the benefit of International Application No. PCT/CN2019/070015, filed on Jan. 2, 2019 and European Patent Application No. 19158737.7, filed on Feb. 22, 2019. These applications are hereby incorporated by reference herein.

FIELD OF THE INVENTION

This invention relates to lamps having safety circuits, in particular for limiting or preventing power being provided to terminals of the lamp when they may be contacted by a user.

BACKGROUND OF THE INVENTION

Solid state lighting (SSL) is rapidly becoming the norm in many lighting applications. This is because SSL elements such as light emitting diodes (LEDs) can exhibit superior lifetime and energy consumption, as well as enabling controllable light output color, intensity, beam spread and/or lighting direction.

Tubular lighting devices are widely used in commercial lighting applications, such as for office lighting, for retail environments, in corridors, in hotels, etc. A conventional tubular light fitting has a socket connector at each end for making mechanical and electrical connection to connection pins at each end of a tubular light. Conventional tubular lights are in the form of fluorescent light tubes. There is a huge installed base of luminaires equipped with ballasts for fluorescent tube lamps. Both electromagnetic (EM) and electronic high frequency (HF) ballasts are used in fluorescent lighting.

There are now tubular LED ("TLED") lamps which can be used as a direct replacement for traditional fluorescent light tubes. In this way, the advantages of solid state lighting can be obtained without the expense of changing existing light fittings. Indeed, TLEDs that are compatible with fluorescent lamp ballasts are the most straightforward and lowest cost way of replacing fluorescent lighting by LED lighting. Both rewiring (removing the ballast, connecting a TLED directly to AC mains) and replacing the whole luminaire are considerably more cumbersome and expensive. It is advantageous to provide a TLED that is compatible with the existing luminaire and the ballast therein.

A fluorescent ballast typically comprises a half-bridge parallel resonant converter. The ballast and lamp (e.g. a high frequency compatible TLED) are connected via connection pins at one end of the TLED and via connection pins at the other end of the TLED. A high frequency compatible TLED typically comprises a filament emulation unit, a pin safety and start-up circuit, a matching circuit, a rectifier, an LED driver, a smoothing capacitor and an LED string. The LED string extends between an internal ground and a high voltage DC bus.

Figure 1:
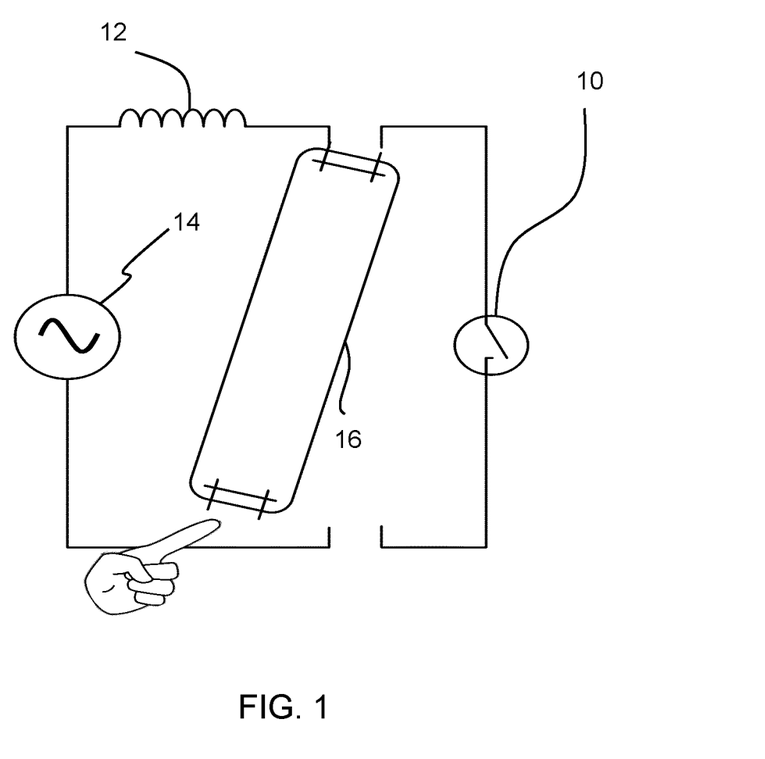
FIG. 1 shows the basic circuit of a standard fluorescent light tube luminaire.

FIG. 1 shows the basic circuit of a standard fluorescent light tube luminaire. It comprises a glow starter 10, ballast 12 and the mains AC source 14. Together with filament wires bridging the pairs of contact pins at each end of the tube 16, a closed circuit is formed. A basic electromagnetic (EM) ballast such as shown in FIG. 1 may operate at mains frequency, whereas an electronic ballast has electronic components to operate at a high frequency, such as 20 kHz.

FIG. 1 illustrates how it is safe to touch the non-connected end of the tube for a fluorescent light tube. A conventional fluorescent light tube can be inserted into such a live mains fixture without any danger because the connection pins on either side of the lamp are electrically insulated from each other by the glass tube of the lamp and the gas inside it. An electrical contact between the two ends of the lamp is only established if the gas inside it is ignited and this is only possible after both ends of the lamp have been inserted into the luminaire.

Taking the lamp out of the luminaire will immediately stop both the current flowing through it and the gas discharge in it and thus immediately re-establish electrical insulation between both ends of the lamp.

However, inserting a TLED lamp into a luminaire is potentially dangerous since it is possible to touch the connection pins on one end of the lamp whilst the other end of the lamp is already inserted and in contact with a hazardous voltage.

There are also mains TLED lamps that connects directly to the mains, and those mains TLED lamps are suitable for new installations without pre-installed ballast.

A typical TLED retrofit lamp contains LED PCBs and LED driver PCBs which offer little electrical insulation between the connection pins on both ends of the TLED. It may therefore be dangerous to insert such a TLED into a live mains fixture because there is a conductive path between the two ends of the tube.

Various pin safety measures have been proposed to overcome this safety issue. These pin safety measures usually interrupt the electrical connection between both ends of the TLED by at least one switch that is only closed when both ends of the TLED are inserted into the luminaire. Both electrical and mechanical pin safety mechanisms are known.

In one example of electrical pin safety circuit, disclosed in US 2018/0324925, the circuit performs a probing function to determine if there is mains or else human body impedance present at the terminals, after the external mains input is applied. If the mains is detected without human body interference, the driver is enabled and the lamp turns ON.

The detection between mains or human body impedance is based on measuring a voltage across a test impedance (i.e. measuring a current). This current is drawn from the mains input when the mains voltage is within a certain threshold (e.g. 40 V). Based on the peak value of the mains current it can be concluded whether a human body impedance is present. In particular, the test impedance is in series with the possible human body impedance. The voltage on the test impedance is typically much higher if there is a human body impedance connected that would otherwise take up a larger voltage portion of the mains.

This detection function can be performed once or several times before enabling the driver. In the known approach, the detection takes place exactly at the same moment after the lamp is powered on. For example, the detection process may start 1.5 cycles after the external mains power is applied.

Current designs allow around 50 lamps to be connected in parallel, because otherwise the combination (in parallel) of all of the test impedances is too small to appear to the testing circuit and thus cannot take a substantial portion of the mains voltage. This condition is seen by the test circuit as a condition that a human body impedance is present and takes up a large portion of the mains voltage. Thus, if more than 50 lamps are connected in parallel and switched on at the same moment, they will typically all give an incorrect test result and will stay off even when no human body impedance is in fact present.

It would be desirable to be able to place a greater number of lamps in parallel, but still enable a reliable safety test to be performed.

In a second aspect of the invention, TLED may also connected to an electromagnetic (EM) ballast. The pin safety function is also expected in this installation. However, lamp with human touch detection circuit via leakage current is almost no way used in the luminaires which has EM ballast. The reason is that inductor in the EM ballast would not allow such a leakage/pulse current, and there is less/no voltage on the impedance for doing the test/test impedance, thus the TLED may still consider there is a human impedance to take the large voltage and the TLED would not start.

US20180310370A1 discloses a circuit for mitigating electrical shock wherein a tubular LED lamp repeats a safety test at different time. U.S. Pat. No. 10,117,302B1 is similar in an aspect of repeating a safety test at different time, with an ideal period between.

SUMMARY OF THE INVENTION

It is a concept of the invention to vary the time at which a safety test is performed by a lamp, so that at least some of a set of different lamps which are connected in parallel will perform their safety tests at different times. In this way, the number of lamps performing tests at the same time is reduced. This means the test measurements do not interfere with each other such as to cause erroneous test results. The time variation may be achieved by changing a time period between power being applied to a lamp and the test, or by delaying the powering on itself.

The invention is defined by the claims.

According to examples in accordance with a first aspect of the invention, there is provided a system of multiple lamps, wherein each lamp comprises:

first and second electrical connection terminals for connection to external power;

a light emitting circuit for powering by the external power; and a safety circuit connected to the first and second electrical connection terminals, wherein the safety circuit is adapted to:

apply a test to detect if the first and second electrical connection terminals are both connected to external power without the interfering impedance; and to enable operation of the light emitting circuit of the lamp when the first and second electrical connection terminals are both detected as connected to the external power without the interfering impedance, wherein at least two of said lamps are adapted to apply their respective test at a different time instant.

By testing at different times, it becomes possible for many lamps to be connected, for example to a shared circuit breaker/switch/mains. There may be more than 50, more than 100 or even more than 200 lamps connected in parallel to a shared circuit breaker/switch/mains.

In a second aspect of the invention, it is provided a lamp to be used in the above system and the lamp comprising:

first and second electrical connection terminals for connection to external power;

a light emitting circuit for being powered by the external power; and a safety circuit connected to the first and second electrical connection terminals, wherein the safety circuit is adapted to:

apply a test to detect if the first and second electrical connection terminals are both connected to external power without an interfering impedance; and enable operation of the light emitting circuit when the first and second electrical connection terminals are both detected as connected to the external power without the interfering impedance, wherein the safety circuit is adapted to select a time at which the test is applied which time is different from a time when another lamp in the system applies a test.

This lamp applies a test to make sure both connection terminals are connected to the external power, and without an interfering impedance (such as a user touching an electrical connection terminal), before enabling operation of the light emitting circuit of the lamp. Until the operation is enabled, the safety circuit maintains any exposed electrical connection terminals in a safe-to-touch state. The safety test is performed at a selected time. This means that if multiple such lamps are connected together in a circuit, they can perform their respective tests at different times even if they are activated at the same time. For example, if the external power is applied to a large set of connected lamps, they will otherwise all perform their tests at the same time. This can result in false test readings. The invention thus prevents the possibility of the test giving a false result, and hence not allowing the lamps to be enabled, because multiple lamps are influencing the test results.

The invention is of particular benefit for retrofit tubular LED lamps, where one end of the lamp is connected to a lamp housing before the other end, and while one end is connected a safety circuit is used to make sure there is no danger in contacting the terminals at the other end.

The safety circuit may be an integrated part of the light emitting circuit, e.g. a driver circuit of the light emitting circuit, or it may be an additional circuit.

Note that the plurality of times may be a relatively small set of discrete times or there may be a continuum of times at which the test may be carried out. The time at which the test is carried out is typically a time relative to the time at which the external power is applied to at least one of the electrical connection terminals. It may be a time relative to a particular point of the external power waveform (e.g. relative to a particular phase angle of AC external power or a particular voltage level).

The plurality of possible times for example comprises at least 10 different possible times within a test time window, and said interfering impedance comprises a human body impedance.

By allowing a relatively large number of possible times, it becomes possible for many lamps to perform their tests at different times, so that many lamps may be connected, for example to a shared circuit breaker.

The external power for example comprises AC mains power, and the test time window is a fixed phase angle range of the AC mains period or an instantaneous voltage range of the AC mains power.

Thus, the testing times are within a range of phase angles or voltage levels of the AC power. Note that these are essentially equivalent in that the variation of the voltage defines the AC waveform and hence defines the set of phase angles.

The plurality of times may comprise a plurality of said fixed phase angle ranges or a plurality of said instantaneous voltage ranges below 60 Volts, each within a respective one of a set of different cycles of the AC power after powering up of the safety circuit.

In this way, the test may be carried in one of a set of AC cycles, and within the particular AC cycle at one of a plurality of possible timing instants. This multiplies the number of possible test times. The safety circuit is powered up when receiving power from the first and second electrical connection terminals. Before then, operation of the light emitting circuit of the lamp is disabled.

The safety circuit for example comprises:
a test impedance;
a voltage detection circuit adapted to draw a test current from the first and second electrical connection terminals at the test time and measure a voltage across the test impedance; and
a controller adapted to determine that the first and second electrical connection terminals are both connected to external power without an interfering impedance when the measured voltage is higher than a threshold.

This enables an impedance measurement to be made. This impedance will vary depending on whether both terminals are connected to the external power, or if only one is connected and the other is touched by a user.

The safety circuit is for example adapted:
when the first and second electrical connection terminals are not both detected as connected to the external power without the interfering impedance, to select a time period, preferably from a plurality of possible time periods, after which the test is to be repeated; and
to repeat the test after the selected time period.

In this way, if a repeated test is needed (because the test did not allow the light emitting circuit of the lamp to be enabled), the repeated test for one lamp will take place at a different time to the repeated test of another lamp. This ensures non-overlap of repeat test times.

When the external power comprises AC power, the selected time period may comprise a number of cycles of the AC power, and the test circuit comprises a zero crossing detector for counting the number of cycles of the AC power.

Thus, the repeat test may take place after a delay of a variable number of cycles of the AC power.

The time at which the test is applied may be randomly selected. This may apply both to a first test and to repeated tests. In this way, all lamps may be of the same design; they do not need to have built-in different test times. By selecting test times randomly, it can be ensured that within a large set of identical lamps, it is statistically unlikely that more than a permitted number will perform their tests at the same time.

The safety circuit may comprise an integrated circuit having a voltage detector for detecting a voltage of the external power supply after powering up of the integrated circuit, and it may be adapted to draw the test current when the detected voltage meets a test condition of the external power.

In this way, the test is carried out when a particular voltage is present, thus allowing an impedance measurement. Note that voltage-based or current-based testing are in fact possible.

The integrated circuit may comprise, for selecting said time at which the test is applied, on or more of:
a first modifying circuit adapted to set a test condition;
a second modifying circuit adapted to determine a cycle or half cycle within which to perform the test among different cycles; and
a third modifying circuit adapted to determine a time period for repeating the test, among different time periods.

The first modifying circuit may for example set the test condition as a randomly selected threshold voltage.

In this example, the test timing is altered by changing the test condition (e.g. the voltage at which the test is carried out, and hence the timing within the external power voltage waveform at which the test is carried out). For example, some lamps may do the test around 30V, some lamps do the test around 45V, and the rest may do the test around 60V. Alternatively or additionally, the lamp may select which cycle or half cycle to do the test, so that some may do the test in the positive half cycle and the others may do the test in the negative half cycle. Alternatively, some lamps may perform the test during the leading edge of the mains and others may perform the test during the trailing edge of the mains. Furthermore, a repeat test time is also selected. These timing selections can be carried out by an integrated circuit.

In more detailed implementation, the first modifying circuit comprises a first random number generator to randomly decide a specific voltage within the scope in a same half cycle to apply the test; and/or
the second modifying circuit comprises a second random number generator to randomly decide in which half cycle after powering up to apply the test; and/or
the third modifying circuit comprises a third random number generator to randomly determine a time period for repeating the test.

The safety circuit may instead further comprise, peripheral to the integrated circuit:
a first delay circuit adapted to select a time delay and to disable the detection by the integrated circuit of the voltage of the power supply by the time delay; or
a second delay circuit adapted to select a time delay for the powering up of the integrated circuit by the time delay.

In this example, a powering up of the integrated circuit or the use of the integrated circuit once powered up may be delayed. This may even be performed by a delay unit outside the integrated circuit, even outside the lamp, thus enabling a non-modified integrated circuit or non-modified lamp to be used.

Thus, different ways are possible for setting the test time.

Each individual lamp may be of the type as defined above.

The invention also provides a safety circuit for safety testing to be used within a lamp having first and second electrical connection terminals for connection to external power and a light emitting circuit for powering by the external power, wherein the safety circuit comprises:
a testing unit adapted to apply a test to detect if the first and second electrical connection terminals are both connected to external power without an interfering impedance; and
an enabling unit to enable operation of the light emitting circuit of the lamp when the first and second electrical connection terminals are both detected as connected to the external power without the interfering impedance,
wherein the safety circuit comprises a timing selection unit for selecting a time at which the test is applied such that the selected time is different from a time when another lamp in the system applies a test.

This safety circuit may be applied as a modification to some existing lamp designs.

The safety circuit is for example embedded into an integrated circuit, and the testing unit is adapted to apply the test when a test condition of the external power is met, and the timing selection unit comprises:
a first modifying circuit adapted to set the test condition;

a second modifying circuit adapted for deciding a cycle or half cycle among different cycles within which to perform the test; and a third modifying circuit adapted to determine a time period for repeating the test, among different time periods, wherein the first modifying circuit comprises a first random number generator to randomly decide a specific voltage within the scope in a same half cycle to apply the test; and/or the second modifying circuit comprises a second random number generator to randomly decide in which half cycle after powering up to apply the test; and/or the third modifying circuit comprises a third random number generator to randomly determine a time period for repeating the test.

The safety circuit is preferably an IC and the circuit(s) that implements the time division is then preferably also embedded into the IC.

According to examples in accordance with a second aspect of the invention, there is provided a kit of lighting device to be installed in a traditional electromagnetic lighting fixture for discharge lamp, comprises a lamp to replace a traditional discharge lamp and an energy storage component to be placed in parallel with the light circuit, wherein, the lamp comprising:

first and second electrical connection terminals for connection to external power;

a light emitting circuit for being powered by the external power; and a safety circuit connected to the first and second electrical connection terminals, wherein the safety circuit is adapted to:

apply a test to detect if the first and second electrical connection terminals are both connected to external power without an interfering impedance; and enable operation of the light emitting circuit when the first and second electrical connection terminals are both detected as connected to the external power without the interfering impedance; and the energy storage device is adapted to be charged by the traditional electromagnetic lighting fixture and discharge to allow the safety circuit to apply the test.

By this aspect of the invention, even if the electromagnetic lighting fixture/electromagnetic ballast does not allow a pulse test current, the energy storage device discharges only when there is no human touch (namely safe) to allow the safety circuit to determine that there is no interfering impedance. Thus the kit of lighting device can support the traditional electromagnetic lighting fixture for discharge lamp very well.

Preferably, the safety circuit comprises:

a test impedance;

a voltage detection circuit adapted to draw a test current from the first and second electrical connection terminals at the test time and measure a voltage across the test impedance; and a controller adapted to determine that the first and second electrical connection terminals are both connected to external power without an interfering impedance when the measured voltage is higher than a threshold; and the energy storage device is adapted to be charged at least to the threshold and adapted to provide the test current.

Preferably, the threshold is 30V.

Preferably, the energy storage device is adapted to allow a 100 mA to 200 mA current to safety circuit for detection.

Preferably, the energy storage device is only a capacitor with a capacitance of at least 0.1 µF without a resistance.

Preferably the energy storage device is outside of the lamp. Preferably the energy storage device is with an interface the same as a traditional starter and is used for replacing the traditional starter. This provides a convenient way for retrofitting the existing/traditional lighting fixture for discharge lamps.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which:

FIG. 3 shows how the detection takes place exactly at the same moment after the lamp is powered on;

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a lamp having a safety circuit connected to first and second electrical connection terminals. A test is used to detect if the first and second electrical connection terminals are both connected to external power without an interfering impedance such a human body, and only then enable operation of the lamp. A time for the test is selected from a plurality of possible times.

As mentioned above, US 2018/0324925 discloses an example of a safety circuit of the type discussed above. An impedance is connected between the two ends of the tube, and a voltage detector is used to measure a voltage across the impedance. The voltage detection only takes place when the mains voltage is at a low voltage level (e.g. below 40V).

Figure 2:
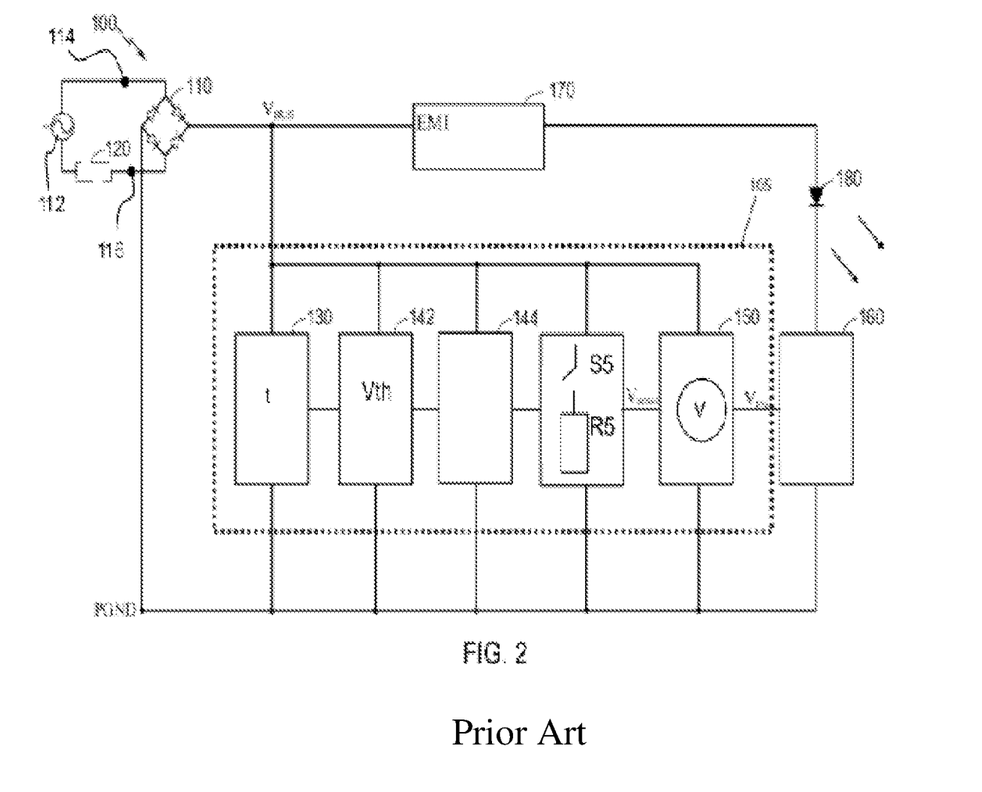
FIG. 2 shows a LED tube circuit as disclosed in US 2018/0324925.

FIG. 2 shows a LED tube circuit 100 as disclosed in US 2018/0324925. The circuit 100 comprises a rectifier circuit 110 for receiving mains power 112. First and second electrical connection terminals 114, 116 are shown, which represent the connection of the LED tube to the external power supply, i.e., to an AC mains. The circuit 100 comprises an EMI suppression circuit 170, a voltage threshold circuit 142, a first control circuit 144, a test impedance R5, a test switch S5, a timing circuit 130, a voltage detection circuit 150, a driving circuit 160 and a LED 180.

The voltage threshold circuit 142, first control circuit 144, impedance R5, timing circuit 130, and voltage detection circuit 150 may constitute a safety circuit 105.

When the LED tube is powered on, the alternating current provided by the mains alternating supply is rectified by the rectifier circuit 110. The root-mean-square (RMS) of the mains alternating voltage AC can for example be from 90V to 230V, such as 220V. The rectified direct voltage $V_{BUS}$ is provided to the EMI suppression circuit 170, the timing circuit 130, the voltage threshold circuit 142, the first control circuit 144, the switched impedance R5, S5 and the voltage detection circuit 150. The safety circuit 105 detects whether a person contacts the supply loop. If someone contacts the supply loop, it is equivalent to connecting an impedance 120 between the rectifier circuit 110 and the alternating current source; if no one contacts the supply loop, there is no impedance 120 between the rectifier circuit 110 and the alternating current source AC.

If touched without the safety circuit, the electric circuit including the LED 180 and the driving circuit 160 is closed by the human body impedance so that dangerous currents may flow through the human body.

However, with the safety circuit, during detection, the LED 180 and the driving circuit 160 are not in operation mode so no electric current is conducted therethrough. Thus, the driving circuit is disabled by default with the circuit is first powered, until it is detected that it is safe to enable the driver circuit.

The impedance R5 is used to divide the voltage with the possible human body impedance 120 and the safety circuit 105 detects the voltage across the impedance R5 and generates a detection signal $V_{SENSE}$. The voltage detection circuit 150 detects the voltage $V_{SENSE}$ and generates an enable signal $V_{EN}$ to selectively enable the driving circuit 160, so as to selectively drive the LED 180. For example, when the $V_{SENSE}$ signal is greater than the threshold voltage, it means the mains supply is completely applied to the impedance R5 and no one contacts the LED tube supply loop. The driving circuit 160 can thus drive the LED 180. On the contrary, when the $V_{SENSE}$ signal is not greater than the threshold voltage, it means there may be human body contact on the LED tube supply loop and only a part of the mains supply is applied to detect the impedance and the driving circuit 180 is disabled; therefore, the LED 180 cannot be driven.

It can be appreciated that the driving circuit 160 can be any currently known or later developed driving circuits that can be used for driving the LED 180, like shunt switch-based, or switched mode power supply-based.

As seen from FIG. 2, the LED light source 180 and the LED driving circuit 160 are in a series connection, and the series connection is in parallel with the test impedance R5 and test switch S5, between $V_{BUS}$ and PGND.

The voltage threshold circuit 142, the first control circuit 144, the impedance R5 and the voltage detection circuit 150 operate only when the input voltage is relatively low (e.g., lower than 60 Volts, for example lower than 40 Volts, for example lower than 30 Volts). The detection function can be performed once or several times before enabling the driver.

Further details of the circuit implementation can be found in US 2018/0324925.

In the known system, the lamps in the parallel connection are the same model and hence circuit, and the detection usually takes place exactly at the same moment after the lamp is powered on. For example, after the internal power on of the detection circuit, the detection process may start after 1.5 cycles of external mains power is applied as shown in FIG. 3.

Figure 3:
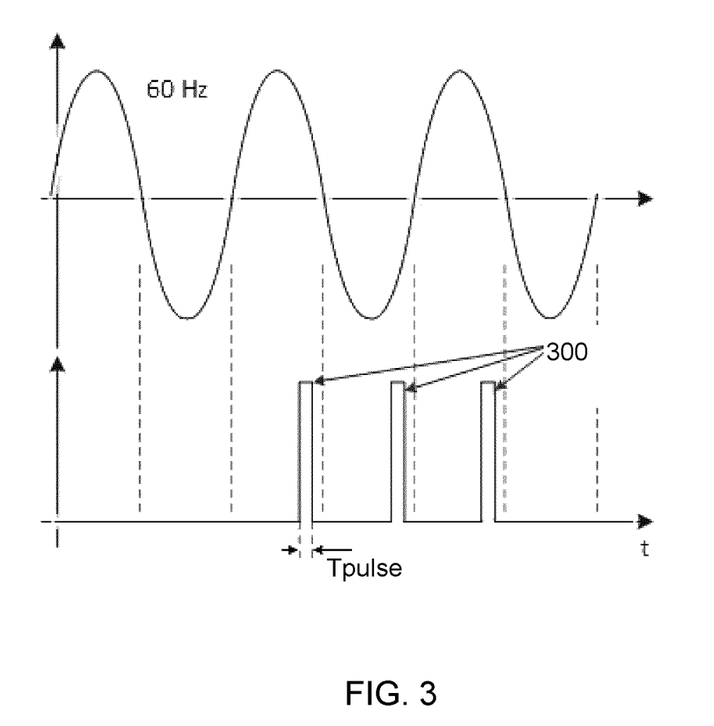

The top plot of FIG. 3 shows the mains voltage, and the bottom plot shows current pulses 300 of duration Tpulse which are drawn from the mains (when switch S5 is closed) for the purposes of impedance measurement.

Figure 4:
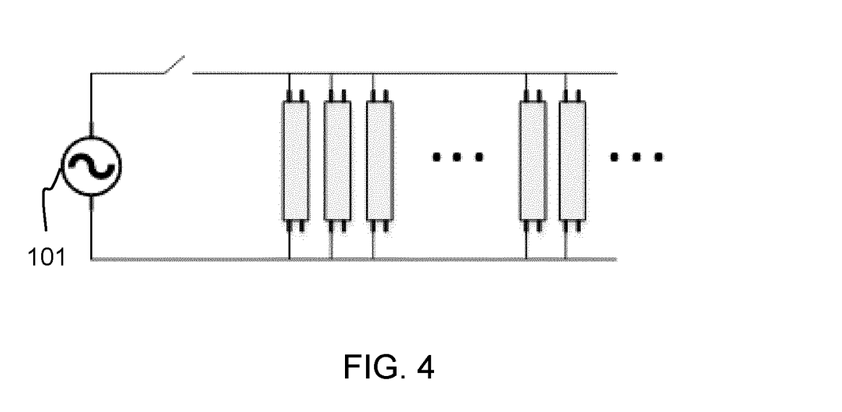
FIG. 4 shows a set of lamps connected in parallel.

Current designs allow around 50 lamps to be connected in parallel as shown in FIG. 4. If more than 50 lamps are connected in parallel and switched on at the same moment, they may all give an incorrect test result and will stay off even when no human body impedance is detected. This is because the impedances R5 are effectively all in parallel. This means there is a reduced voltage across each impedance, which the safety circuit interprets as being the result of the presence of a human body impedance.

There is a line impedance between the AC and the lamps, so when there are too many lamps, the parallel connection of the multiple test resistors becomes a small impedance, so that the line impedances becomes more dominant. Thus, the voltage measured across the test resistor is smaller as if a human body impedance is present.

The invention provides a modification to the safety circuit described above. It performs the same function of detecting if the first and second electrical connection terminals 114, 116 are both connected to external power without an interfering impedance 120. Operation of the lamp is only enabled when the first and second electrical connection terminals are both detected as connected to the external power without the interfering impedance.

The safety circuit is adapted to select a time at which the test is applied from a plurality of possible times. In this way, at least some of the lamps do not do the test at the same time as some others of the lamps.

Figure 5:
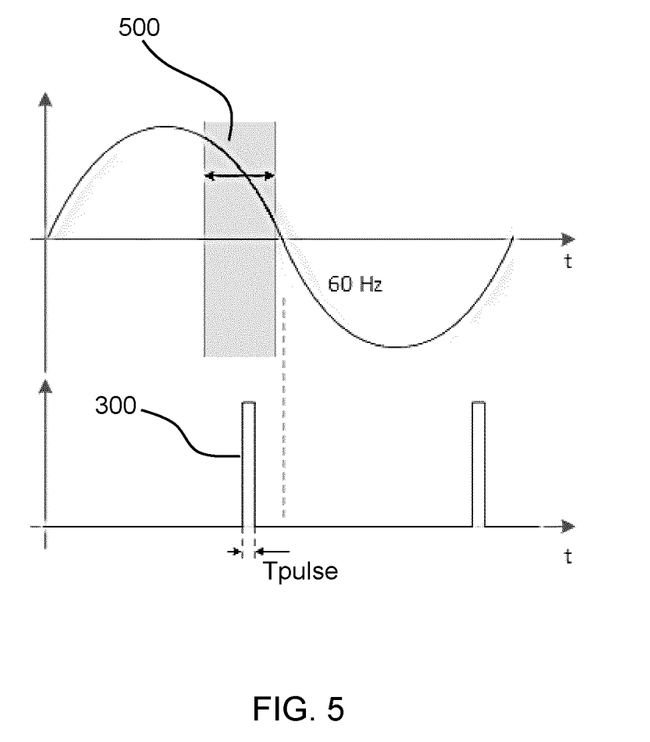
FIG. 5 shows how the safety circuit is adapted to select a time at which the test is applied from a plurality of possible times, in accordance with the invention.

FIG. 5 shows a timing diagram to represent this function. The detection pulse 300 may be applied at a variable time within a time window 500. In one example, the detection pulse 300 may be applied at a random time within the time window. The time window 500 covers a range of phase angles of the mains supply, such as from 60V phase to 10V phase (the window 500 shown in FIG. 5 is exaggerated) in the trailing edge. Similarly, the time window can be differently selected among the lamps, such as some different lamps select from 10V to 60V in the leading edge, different other lamps select from 60V phase to 10V phase in the trailing edge. The time window 500 may be considered to cover a range of voltage levels, or equivalently a range of phase angles, of the mains supply.

In addition to setting a time window within an individual cycle (or half cycle, since after rectification the signal will comprise a set of positive only half cycles) of the mains input, a cycle (or half cycle) may be selected from a set of different cycles or half cycles. For this purpose, the safety circuit 105 detects the presence of a mains signal and also measures a timing of the signal, for example based on detection of zero-crossings. In this way, a count is made of the mains cycles from the moment a mains signal is applied.

This functionality can be implemented in an IC. Note that if the detection circuit is after the rectifier, it may not be able to distinguish positive or negative half cycle. If the detection circuit is before the rectifier, positive and negative half cycles can be selectively decided to time divide the test.

In one example, after being powered on, the safety circuit randomly selects the position of the detection pulse 300 within a mains half cycle as well as in which mains half cycle, within a given interval after the time of powering on, detection will be performed.

If human body impedance is detected (or more accurately it is detected that the mains signal is not connected to both electrical connection terminals with no detected human body impedance) the safety circuit also randomly selects after how many cycles the detection process will be repeated.

Figure 6:
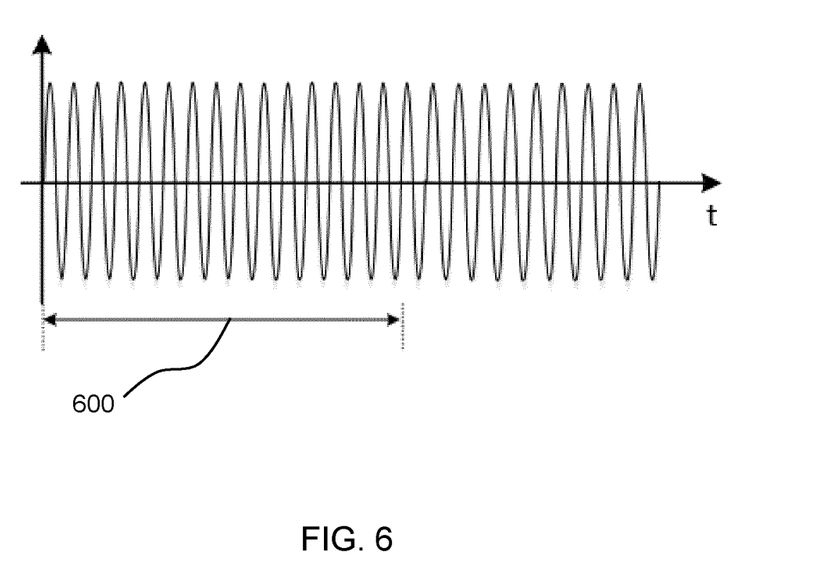
FIG. 6 shows a time period, comprising a number of mains cycles, within which the test may be randomly selected.

FIG. 6 shows a time period 600, comprising a number of mains cycles, within which the test may be randomly selected. The time period within which a repeat test is performed may be the same or different.

The detection pulse 300 is typically very narrow, for example around 50 μs. The position is randomly varied within the time window. For example, the time window may be the time period between (i) the time when the mains signal falls to 60 V and (ii) the time when the mains signal falls to 20 V.

The safety circuit selects the pulse location each time it is powered on. The width of this interval is around ~700 μs (at 60 Hz). In this example, the detection pulse 300 can be placed at for example 17 different locations within a single time window.

More generally, the plurality of possible times within each time window for example comprises at least 10 different possible times. Instead of a set of discrete times, there may be a continuum of times at which the test may be carried out. The time at which the test is carried out is typically a time relative to the time at which the external power is applied to the electrical connection terminals.

When only one terminal is connected and the other is not touched, the safety circuit is not powered. The circuit is powered either when the lamp is correctly fitted at both ends, or if one end is connected and the other end is grounded by the user through the human body impedance. The aim of the detection is to distinguish between these two possibilities so that when the circuit is connected through the user, large currents are not generated.

When the circuit is ground through the human body impedance, the currents present in the circuit are designed to meet standards which dictate current levels allowed to pass through the human body.

By allowing the detection to be performed within any one of a first 30 half cycles after the mains is applied (as an example only) further increases in the number of different locations are achieved.

In this way, the largest number of lamps that can be placed in parallel, with all of them being able to correctly detect the mains connection, becomes 30*17*50 lamps=25500. This is based on the assumption that 50 lamps can be used to detect the mains at the same detection time. Thus, the plurality of times at which the test may be performed then comprises a set of the time windows (phase angle ranges or instantaneous voltage ranges), each one of the set within a respective one of a set of different cycles of the external power after powering up of the safety circuit.

If any lamp detects that the lamp cannot be enabled (because the connection to mains with no human body impedance is not confirmed), that lamp will repeat the detection process after a random number of cycles, selected from pre-defined maximum number of cycles.

The lamp thus applies a test to make sure both connection terminals are connected to the external power, and without an interfering impedance, before enabling operation of the lamp. Until the lamp operation is enabled, the safety circuit maintains any exposed electrical connection terminals in a safe-to-touch state.

Figure 7:
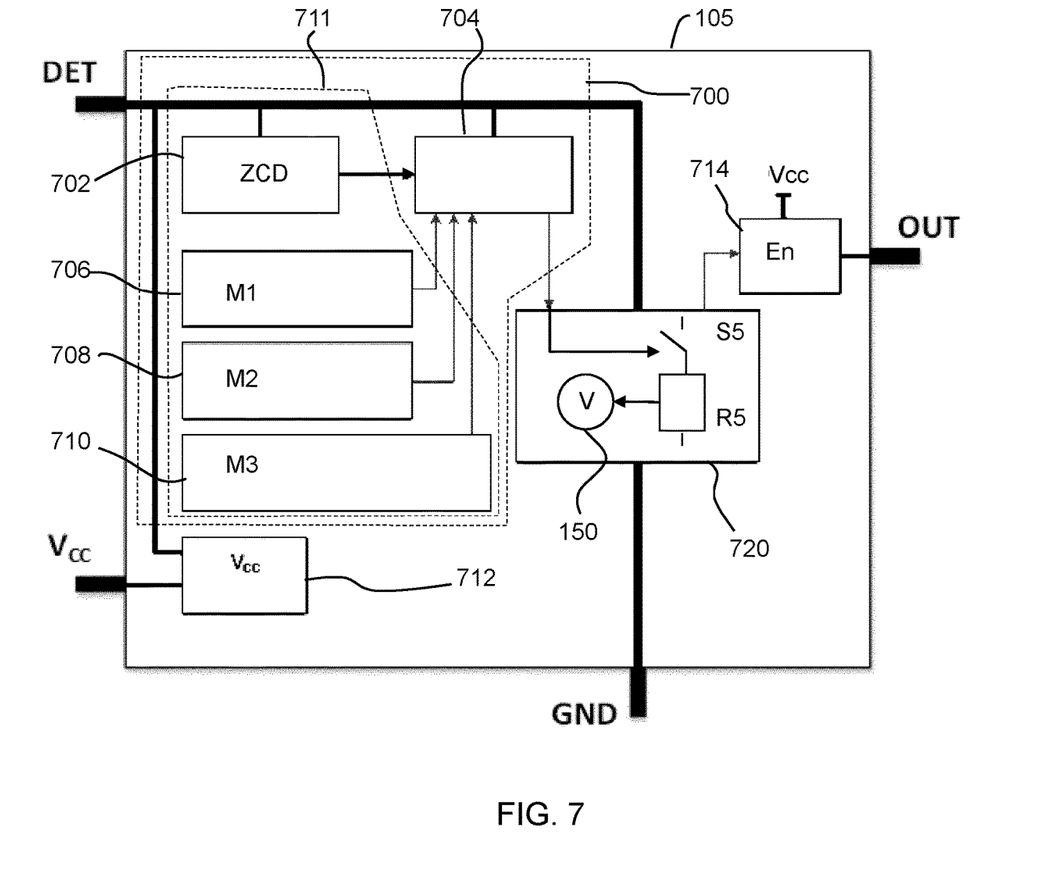
FIG. 7 shows an example of the safety circuit, to show the additional units compared to the circuit of FIG. 2.

FIG. 7 shows an example of the safety circuit 105, to show the additional units compared to the circuit of FIG. 2. It comprises a controller 700 and a testing unit 720. The controller 700 may be implemented in an integrated circuit (IC) as a whole, while the test impedance R5 is outside. Alternatively, the whole circuit 105 may be implemented in an integrated circuit (IC).

DET is the pin to sample the input voltage (mains voltage). Preferably, it has a very large impedance such that whether there is human body impedance does not influence the detection of the mains voltage. Vcc is the local power supply, GND is the local ground and OUT is the output pin for the enable signal which controls whether or not the driver circuit is enabled.

As in the example of FIG. 2, the testing unit 720 of the safety circuit 105 comprise the test impedance R5, the test switch S5 and the voltage detection circuit 150 adapted to draw a test current and measure a voltage across the test impedance R5 for measuring a test current flowing through the test impedance once the test switch S5 is made conductive by the detection of the input voltage.

The controller 700 determines when the measured input voltage meets the test condition, for example within a range of 30V to 60V. The voltage detection circuit 150 determines whether the first and second electrical connection terminals are both connected to external power without an interfering impedance, by confirming that this high voltage indicates that substantially all of the input voltage is dropped across the test impedance.

The safety circuit comprises a zero crossing detector 702 for counting the number of cycles of the AC power. This is used to select which cycle is used for the test, and indeed for any required repeat tests.

A voltage detector 704 within the controller 700 is used for detecting a voltage of the external power supply after powering up of the circuit. It applies a threshold so that the test current is drawn and the voltage is measured when the detected mains voltage meets a test condition. In this way, the test is carried out when a particular voltage is present, and hence at a particular phase of the mains input power.

For selecting the time at which the test is applied, there is a first modifying circuit 706 adapted to set a test condition. This is for example a test voltage between 20V and 60V. The first modifying circuit 706 may comprise a random number generator to randomly decide the specific voltage within the scope.

A second modifying circuit 708 is adapted to determine a half cycle within which to perform the test among different half cycles as explained with reference to FIG. 6. The second modifying circuit 708 may comprise a random number generator to randomly decide in which half cycle after powering up to perform the test.

A third modifying circuit 710 is adapted to determine a time period for repeating the test, among different time periods. Similarly, the third modifying circuit 710 may comprise a random number generator to randomly determine the time period.

Those skilled in the art understand that, in the field of digital circuit/computer science, the term random/randomly comprises either of a pseudo random mechanism or a true (hardware-based) random mechanism. For a pseudo random mechanism, a different seed can be provided/set at the factory to the random number generator thereby when used on site, the different safety circuit in different lamp can provide different time for applying the test.

The units 702, 706, 708, 710 may be considered together to define a timing selection unit 711.

FIG. 7 also shows a supply voltage generating circuit 712 for powering the safety circuit 105. An enabling unit 714 performs the enabling function to allow the lamp to be operated, or to disable the lamp from operation.

The test timing is altered by changing the test condition, in this case the voltage and hence phase at which the test is carried out, as well as the half cycle in which the test is applied. The repeat test time is also selected.

The random time determined by unit 706 may be derived only once at powering up. Similarly, the random number of cycles for the repeat tests may be set once at powering up. Thus, the repeat test may be applied at the same time within a time window, but the time window itself is randomly selected.

After the LED is powered up, no further testing is needed, until there is a power disconnection and reconnection.

Of course, the random selections may be made more frequently and not only at powering up.

Furthermore, an alternative is to apply the random settings in the factory, so that each safety circuit has a random setting applied in the factory rather than performing the random timing generation within the circuit. Of course, random generation within the circuit avoids the risk of a continuous clash between different circuits. This is useful if circuit 700 including the first, second, and third modifying circuits are implemented by discrete components.

The example above is based on changing the timing of the test pulses relative to the time at which mains power is applied.

An alternative is to change the timing at which mains power is applied to each lamp. For this purpose, the safety circuit may comprise, peripheral to the integrated circuit which performs the voltage measurement, a delay circuit.

A first option is a delay circuit which selects a time delay and disables the detection by the integrated circuit of the voltage of the power supply by the time delay. In this case, the external voltage detector 704 is disabled for a time delay, instead of using units 706, 708 and 710.

Figure 8:
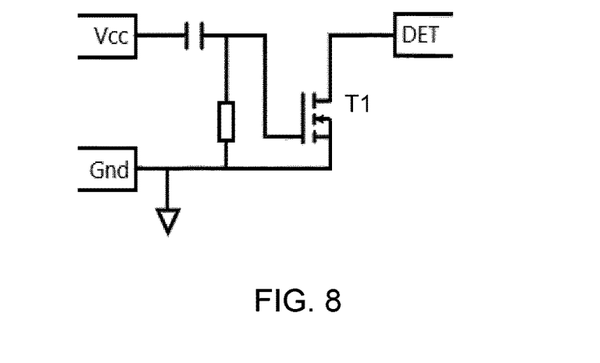
FIG. 8 shows a circuit for staggering the IC detection time.

FIG. 8 shows a circuit for staggering the IC detection time. Most leakage current detection circuits have pins for sampling the input voltage (before or after the rectifier bridge), which determines when the IC starts to enter the detection program. A time-delay patch circuit can then be added to stagger the detection time, so as to stagger the start time and avoid false detection as explained above. The patch circuit is shown in FIG. 8.

Different patch circuits may be applied to different lamps to create a set of different delays. DET is again the pin to sample the input voltage. The detection signal is initially shorted to ground by turning on a MOSFET T1, and the MOSFET is turned off after the RC time constant of an RC filter between the supply voltage Vcc and the gate of the MOSFET T1. The RC time constant may be extend across several half cycles or cycles such that this lamp will do the test later than other lamps without this patch circuit, by several half cycles or cycles.

A second option is a delay circuit that selects a time delay for delaying the powering up of the integrated circuit by that time delay. This delay may be implemented using an external delay unit (inside or outside the lamp), thus enabling a non-modified IC or lamp to be used. For example, for delaying the powering up of the IC, the Vcc to the lamp can be provided with an RC delay. The advantage of this approach is that the required patch circuit is not involved in the control loop of the integrated circuit, so there is no risk of erroneous operation of the IC. This does however require relatively high voltage semiconductor devices.

Figures 9, 10:
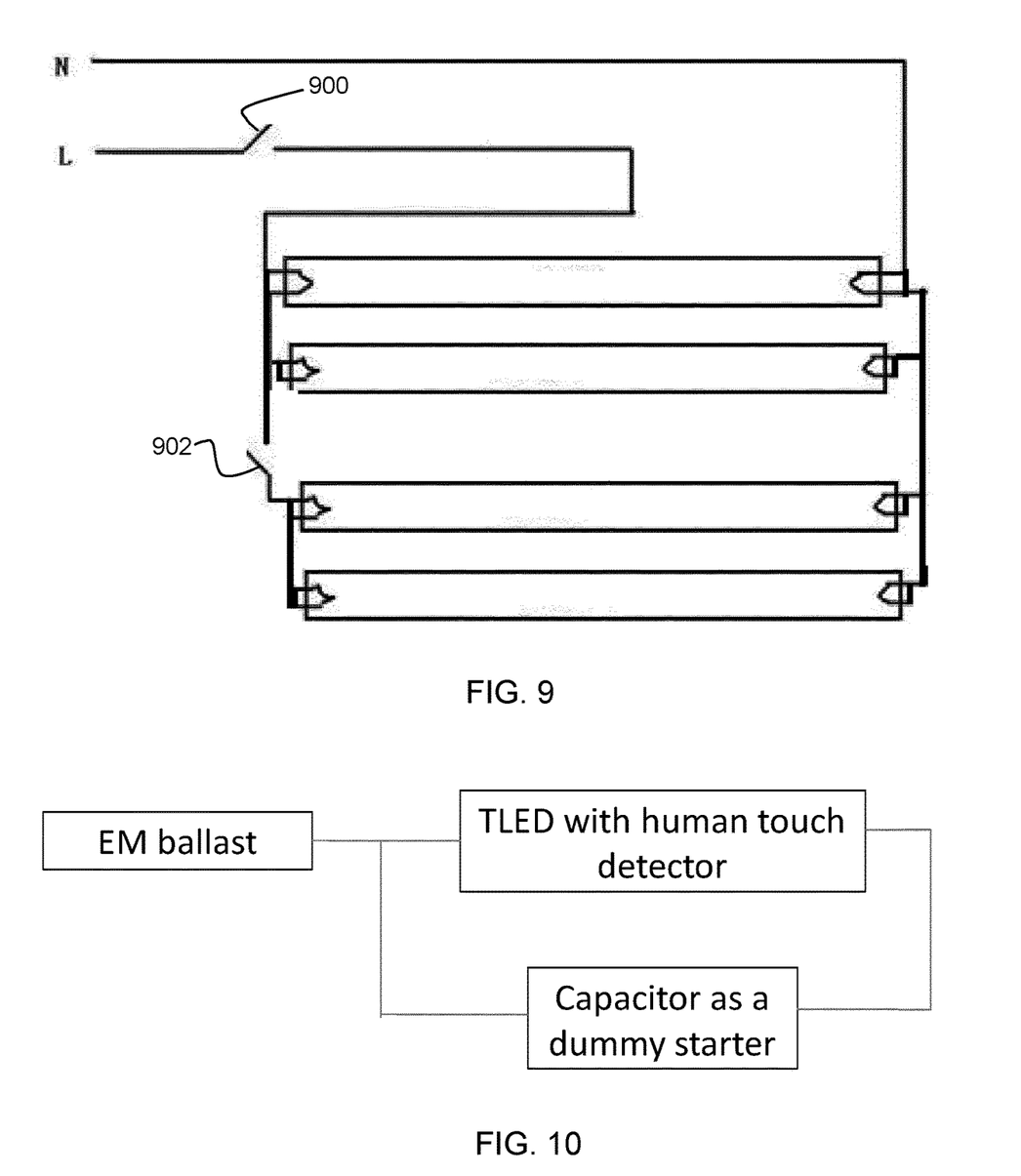
FIG. 9 shows a circuit for supply of external power to different groups of lamps.
FIG. 10 shows a basic diagram of an embodiment of the second aspect of the invention.

Alternatively, for delaying the powering up of the whole lamp, an extra external delay switch can be provided to some lamps. This is shown in FIG. 9, wherein switch 900 is the original wall switch to control all the lamps, and an extra delay switch 902 is added for the two TLED lamps at the bottom. When switch 900 is turned on, the two TLEDs at the top would start their test and operate; the delay time of the switch 902 is set longer than the test time of the two TLED at the top, and the switch 902 is then turned on to allow the two TLED lamps at the bottom to start their test and operate.

In this way, the set of lamps is divided into groups, with the testing performed group-by-group. This approach may be extended to multiple groups, and is not limited to only two groups as shown in FIG. 9.

When multiple lamps are connected in parallel, the approach of the invention is to ensure that at least two of the multiple lamps apply their respective test at a different time instant. By testing at different times, it becomes possible for many lamps to be connected, for example to a shared circuit breaker. There may be more than 50, more than 100 or even more than 200 lamps connected in parallel to a shared circuit breaker.

The invention relates both to a lamp incorporating the circuitry explained above, and also to the safety circuit itself. The main features of the safety circuit are the testing unit 720, and the enabling unit 714 to enable operation of the light emitting circuit of the lamp when the first and second electrical connection terminals are both detected as connected to the external power without the interfering impedance. The timing selection unit 711 is for selecting a time at which the test is applied from a plurality of possible times.

The safety circuit may be an integrated part of the light emitting circuit, e.g. a driver circuit of the light emitting circuit, or it may be an additional circuit. The integrated circuit can include both digital and analog circuitry. Digital circuitry would select the moment of detection (cycle, moment within cycle, repetition rate, repeat test delay) and analog circuitry would perform the detection itself. Alternatively, part of circuitry could be placed outside of IC.

It also noted that voltage-based or current-based testing are possible.

The second aspect of the invention provides a kit of lighting device to be installed in a traditional electromagnetic lighting fixture for discharge lamp, comprises a lamp to replace a traditional discharge lamp and an energy storage component to be placed in parallel with the light circuit, wherein, the lamp comprising:

first and second electrical connection terminals for connection to external power;

a light emitting circuit for being powered by the external power; and a safety circuit connected to the first and second electrical connection terminals, wherein the safety circuit is adapted to:

apply a test to detect if the first and second electrical connection terminals are both connected to external power without an interfering impedance; and enable operation of the light emitting circuit when the first and second electrical connection terminals are both detected as connected to the external power without the interfering impedance;

and the energy storage device is adapted to be charged by the traditional electromagnetic lighting fixture and discharge to allow the safety circuit to apply the test.

FIG. 10 shows a schematic drawing of the second aspect of the invention. The TLED with human touch detector can be referred as that disclosed in US2018/0324925, the embodiment of the first aspect in the above description, or any other TLED with a safety test function but hindered by the characteristics of the electromagnetic ballast. At the same time, the capacitor does not appear in the impedance detection/test circuit loop during the whole lamp installation process, since the pin of the TLED is not connected to the capacitor before it is properly installed in the fixture, so the capacitor has no impact on the safety detection before the proper installation: it would not activate the safety circuit before hand.

If the safety circuit is as described above and comprises:
a test impedance;
a voltage detection circuit adapted to draw a test current from the first and second electrical connection terminals at the test time and measure a voltage across the test impedance; and
a controller adapted to determine that the first and second electrical connection terminals are both connected to external power without an interfering impedance when the measured voltage is higher than a threshold.

The energy storage device is adapted to be charged at least to the threshold and adapted to provide the test current.

Preferably, the threshold is 30V.

Preferably, the energy storage device is adapted to allow a 100 mA to 200 mA current to safety circuit for detection.

Preferably, the energy storage device is only a capacitor with a capacitance of at least 0.1 μF.

Preferably the energy storage device is outside of the lamp. Preferably the energy storage device is with an interface as the same as a traditional starter and is used for replacing the traditional starter.

By comparison, the traditional starter may have a capacitor, but it is either a too small capacitance or has a series resistor thereby it can not allow sufficient test current for enough test time: namely it does not allow the safety circuit to operate.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A system of multiple lamps, wherein each lamp comprises:
first and second electrical connection terminals for connection to an external power supply;
a light emitting circuit for powering by the external power supply; and
a safety circuit for safety testing being used within the lamp having the first and a second electrical connection terminals, wherein the safety circuit comprises a testing unit adapted to apply a test to detect when the first and second electrical connection terminals are both connected to the external power supply without an interfering impedance; and
an enabling unit to enable operation of the light emitting circuit of the lamp when the first and second electrical connection terminals are both detected as connected to the external power without the interfering impedance;
wherein the safety circuit further comprises a timing selection unit for selecting a time at which the test is applied such that the selected time is different from the time when another lamp in the system applies the test.

2. A lamp for use in system according to claim 1, comprising a plurality of lamps.

3. The lamp as claimed in claim 2, wherein a plurality of possible times comprises at least 10 different possible times within a test time window, and said interfering impedance comprises human body impedance.

4. The lamp as claimed in claim 3, wherein the external power supply comprises alternating current (AC) mains power, wherein the test time window is a fixed phase angle range of an AC period or instantaneous voltage range of the AC mains power.

5. The lamp as claimed in claim 4, wherein the plurality of possible times comprises a plurality of said fixed phase angle ranges or a plurality of said instantaneous voltage ranges below 60 Volts, each within a respective one of a set of different cycles of the AC mains power after powering up of the safety circuit.

6. The lamp as claimed in claim 2, wherein the safety circuit comprises:
a test impedance;
a voltage detection circuit adapted to draw a test current from the first and second electrical connection terminals at the test time and measure a voltage across the test impedance; and
a controller adapted to determine that the first and second electrical connection terminals are both connected to the external power supply without the interfering impedance when the measured voltage is higher than a threshold.

7. The lamp as claimed in claim 2, wherein the safety circuit is adapted:
when the first and second electrical connection terminals are not both detected as connected to the external power supply without the interfering impedance, to select a time period, preferably from a plurality of possible time periods, after which the test is to be repeated; and
to repeat the test after the selected time period.

8. The lamp as claimed in claim 7, wherein the external power supply comprises AC power, and the selected time period comprises a number of cycles of the AC power, and the test circuit comprises a zero crossing detector for counting the number of cycles of the AC power.

9. The lamp as claimed in claim 2, wherein the time at which the test is applied is randomly selected.

10. The lamp as claimed in claim 9, wherein the integrated circuit comprises, for selecting said time at which the test is applied, one or more of:
a first modifying circuit adapted to set a test condition;

a second modifying circuit adapted to determine a cycle or half cycle within which to perform the test among different cycles or half cycles; and a third modifying circuit adapted to determine a time period for repeating the test, among different time periods.

11. The lamp as claimed in claim 10, wherein the first modifying circuit comprises a first random number generator to randomly decide a specific voltage within the scope in a same half cycle to apply the test; or the second modifying circuit comprises a second random number generator to randomly decide in which half cycle after powering up to apply the test; or the third modifying circuit comprises a third random number generator to randomly determine a time period for repeating the test.

12. The lamp as claimed in claim 2, wherein the safety circuit comprises an integrated circuit having a voltage detector for detecting a voltage of the external power supply supply after powering up of the integrated circuit, and is adapted to draw the test current when the detected voltage meets a test condition of the external power supply.

13. The lamp as claimed in claim 12, wherein the safety circuit further comprises, peripheral to the integrated circuit:

a first delay circuit adapted to select a time delay and to disable the detection by the integrated circuit of the voltage of the power supply by the time delay; or a second delay circuit adapted to select a time delay for the powering up of the integrated circuit by the time delay.

14. The safety circuit for safety testing to be used within a lamp having first and second electrical connection terminals for connection to external power supply and a light emitting circuit for powering by the external power supply, according to claim 2, wherein the safety circuit comprises:

a testing unit adapted to apply a test to detect when the first and second electrical connection terminals are both connected to external power supply without an interfering impedance; and an enabling unit to enable operation of the light emitting circuit of the lamp when the first and second electrical connection terminals are both detected as connected to the external power supply without the interfering impedance, wherein the safety circuit comprises a timing selection unit for selecting a time at which the test is applied such that the selected time is different from a time when another lamp in the system applies a test.

15. The safety circuit according to claim 14, wherein the safety circuit is embedded into an integrated circuit, and wherein the testing unit is adapted to apply the test when a test condition of the external power supply is met, and the timing selection unit comprises one or more of:

a first modifying circuit adapted to set the test condition;

a second modifying circuit adapted to decide a cycle or half cycle among different cycles within which to perform the test; and a third modifying circuit adapted to determine a time period for repeating the test, among different time periods, wherein the first modifying circuit comprises a first random number generator to randomly decide a specific voltage within the scope in a same half cycle to apply the test; or the second modifying circuit comprises a second random number generator to randomly decide in which half cycle after powering up to apply the test; or the third modifying circuit comprises a third random number generator to randomly determine a time period for repeating the test.

* * * * *